(12) United States Patent
Moore et al.

(10) Patent No.: US 7,866,421 B2
(45) Date of Patent: Jan. 11, 2011

(54) AUTOMATED REMOTE CARRIAGE FOR TIGHTENING GENERATOR WEDGES

(75) Inventors: Charles C. Moore, Hibbs, PA (US); Mark W. Fischer, Pittsburgh, PA (US); James A. Bauer, Gibsonia, PA (US); Waldemar Spruda, Muelheim Ruhr (DE); Olaf Froede, Muelheim Ruhr (DE)

(73) Assignee: Siemens Energy, Inc., Orlando, FL (US)

( * ) Notice: Subject to any disclaimer, the term of this patent is extended or adjusted under 35 U.S.C. 154(b) by 338 days.

(21) Appl. No.: 12/020,780

(22) Filed: Jan. 28, 2008

(65) Prior Publication Data

US 2009/0194346 A1 Aug. 6, 2009

(51) Int. Cl.
*B62D 63/02* (2006.01)
(52) U.S. Cl. .................................. 180/9.21; 180/164
(58) Field of Classification Search .......... 180/164, 180/9.1, 9.21, 9.48; 318/568.11
See application file for complete search history.

(56) References Cited

U.S. PATENT DOCUMENTS

| | | | |
|---|---|---|---|
| 4,029,164 A * | 6/1977 | Urakami .................... | 180/164 |
| 4,200,818 A | 4/1980 | Ruffing et al. | |
| 4,607,183 A | 8/1986 | Rieber et al. | |
| 4,934,475 A * | 6/1990 | Urakami .................... | 180/164 |
| 5,248,008 A | 9/1993 | Clar | |
| 6,124,659 A | 9/2000 | Rowe et al. | |
| 6,653,759 B1 | 11/2003 | Ward et al. | |
| 6,889,783 B1 | 5/2005 | Moore et al. | |
| 6,964,312 B2 * | 11/2005 | Maggio .................... | 180/164 |
| 2002/0104693 A1 | 8/2002 | Moore et al. | |
| 2008/0078599 A1 * | 4/2008 | DeRocher ................ | 180/164 |
| 2008/0179115 A1 * | 7/2008 | Ohm et al. ............... | 180/9.21 |

FOREIGN PATENT DOCUMENTS

EP       1772949 A1       11/2007

* cited by examiner

*Primary Examiner*—Tony H. Winner

(57) ABSTRACT

A remote-controlled dynamoelectric machine maintenance vehicle that can fit and travel within the air gap between a stator and rotor of a dynamoelectric machine. The maintenance vehicle has an effectuator that can remotely attach to an adjustable wedge within a coil slot of the stator and tighten the wedge in position and then move on to repeat the process until all the wedges on the stator are secured.

15 Claims, 5 Drawing Sheets

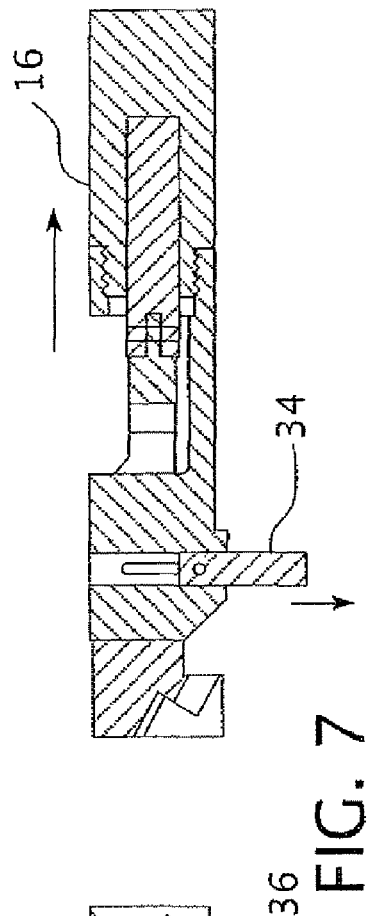
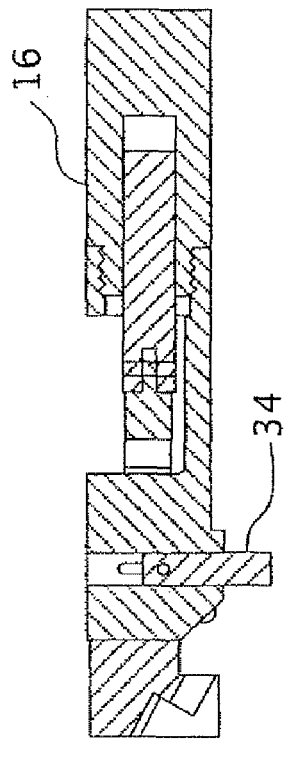
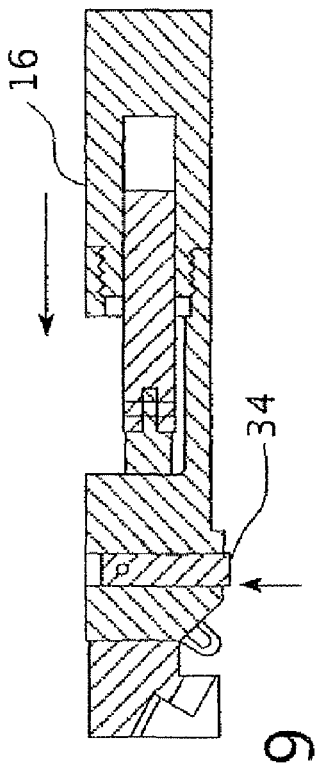
FIG. 7
FIG. 8
FIG. 9
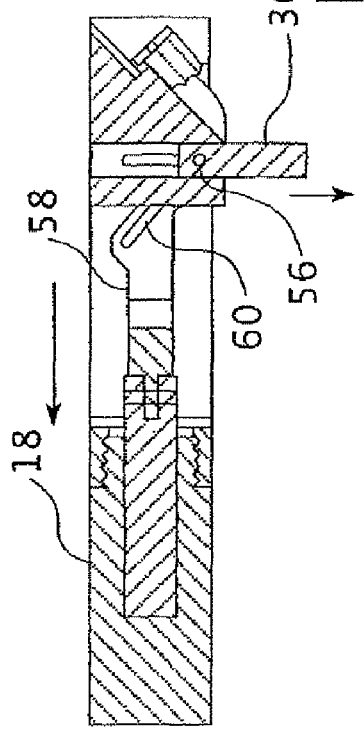
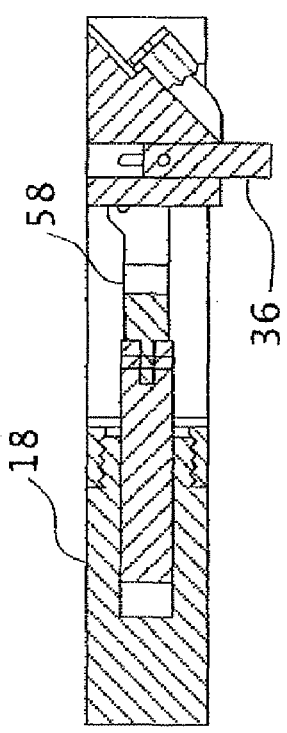
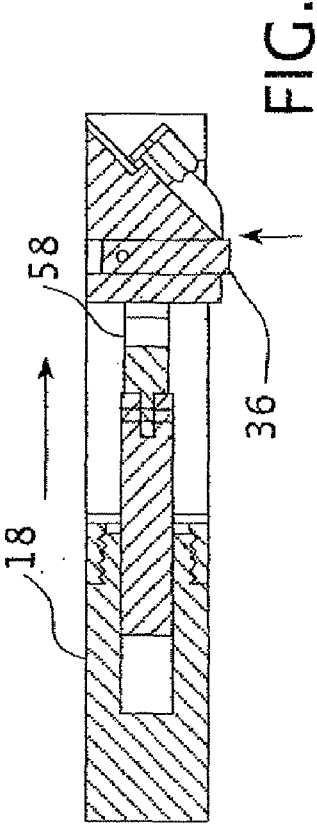

AUTOMATED REMOTE CARRIAGE FOR TIGHTENING GENERATOR WEDGES

BACKGROUND OF THE INVENTION

1. Field of the Invention

The present invention relates to remote-controlled unmanned robotic vehicles. More specifically, the present invention relates to remote-controlled vehicles capable of movement within the air gap between a rotor and stator of a dynamoelectric machine to tighten wedges in the machine's stator slots.

2. Description of Related Art

In dynamoelectric machines and, particularly in the stators of large dynamoelectric machines, it is conventional to build up an annular magnetic mass by stacking thin laminations of magnetic material on key bars. The laminations conventionally include slot-shaped openings therein which are aligned in the stacking process with corresponding openings in all other laminations to form a set of parallel slots in the inner surface of the annular magnetic mass. One or more conductors are placed in each slot to receive the generated electricity if the dynamoelectric machine is a generator or, to receive the driving electric power if the dynamoelectric machine is a motor. The conductors in the slots of a large dynamoelectric machine carry large currents and are subjected to large magnetic fields. They therefore experience very high forces tending to displace them within the slots. If steps are not taken to prevent such an occurrence, the forces acting on the conductors are sufficient to displace them in the slots and to damage or destroy the stator.

In the power generation industry, hundreds of stator wedges are often used to assist in retaining the coils in the stator of a power generator or a motor. The wedges are positioned to overlie the coils. The stator wedges are positioned into wedge grooves or wedge slots formed in the peripheries of the core laminations within the coil slots. The laminations are conventionally formed of coated steel material. The stator wedges are conventionally formed of an epoxy-laminated glass material. Because the stator coil laminations are formed of a coated steel material, it is important that such wedges be formed of a non-conducting material so that a short is not created which can damage various portions of the generator. During use, the large magnetic forces generated by the rotor of a large dynamoelectric machine are sufficient to distort the cross section of the stator from circular to slightly elliptical. The major axis of the elliptical distortion rotates with the magnetic pulse of the rotor at a speed of, for example, 3,600 rpm. The stator slots are thereby cyclically widened and narrowed a very small amount at a frequency of 120 Hz as the maxima and minima of the elliptical distortion travels there past twice per revolution of the rotor. With years of normal operation of such dynamoelectric machines, the stator wedges holding the stator coils can become loose. An undetected loose wedge condition can result in excessive vibration of the coils and eventually lead to a catastrophic failure of the machine. The typical assembly for a stator slot includes the stator coils, stator wedges, and wedge filer material. Normally, when wedges become loose, the generator rotor has to be removed, the loose wedges are removed and new wedges and filler material are installed. This is a time-consuming and expensive process.

Stator wedges have been developed that can be tightened after they have been installed. This style wedge has a main body that is tapered on the underside to which a wedge insert (tapered to match the wedge) is slid beneath it. As the wedge insert is forced against the wedge in the taper of the wedge, it increases the thickness of the wedge assembly, thus compressing the slot contents and tightening the wedge in the wedge grooves or wedge slots referred to above, which are also referred to as the dovetail.

It is an object of this invention to provide an apparatus that can tighten such wedges without removing the rotor.

It is a farther object of this invention to provide an apparatus that can tighten the stator wedges remotely.

It is a further object of this invention to provide such apparatus that can tighten the stator wedges from within the air gap of a dynamoelectric machine remotely under the supervision of an operator.

SUMMARY OF THE INVENTION

The present invention is a remote-controlled maintenance vehicle for tightening wedges in a generator coil slot that can travel and is operable within the air gap of a generator between the rotor and stator. Thus, employing the remote-controlled maintenance vehicle of this invention, generator wedges may be tightened without removing the rotor. While this invention is described in an application to generators, it should be appreciated that it can be applied equally as well to large motors.

The maintenance vehicle of the present invention includes a frame and at least one drive module attached to the frame and having a drive train that utilizes magnetic adhesion to traverse an interior ferromagnetic surface of the dynamoelectric machine. A motor is operatively connected to the drive module and responsive to a signal from a remote controller to provide a motive force to the drive train. An effectuator is attached to the frame and is operable upon command from the remote controller to engage a wedge on the dynamoelectric machine and remotely tighten the wedge in a coil slot on the dynamoelectric machine. The dynamoelectric machine maintenance vehicle is sized and configured to fit between the stator and the rotor of the dynamoelectric machine. Preferably, the wedge comprises a main body and an insert configured so that movement of the insert relative to the main body in one direction increases the width of the wedge in the dynamoelectric machine slot and tightens the coil within the slot. The effectuator comprises a first and a second, spaced, telescoping member. The first telescoping member is operable, upon command, to extend from one side of the frame and engage the wedge insert. The second telescoping member is operable to extend from the one side of the frame and engage the main body of the wedge and at least one of the first and second telescoping members is operable to move in the one direction relative to the other of the first and second telescoping members and tighten the wedge in the slot.

In one preferred embodiment, the telescoping members are pins that substantially fully retract within the frame when not fully extended. Desirably, the pins are operated by miniature pneumatic pistons to retract and extend from the frame. Preferably, the miniature pneumatic pistons are biased in the retracted position so that the first and second telescoping members are in a retracted position if pneumatic supply is disconnected from the pistons. In another embodiment, a camera assembly is provided for remotely viewing the engagement of the first telescoping member and/or the second telescoping member with the main body of the wedge and/or the insert of the wedge.

In still another embodiment, the first telescoping member engages a hole in the insert to the wedge, and the second telescoping member engages a first end of the main body of the wedge that is opposite to a second end of the main body of the wedge into which the insert enters. Preferably, the wedge has an inclined, tapered surface where the insert contacts the main body of the wedge and desirably the main body of the wedge has a mating inclined, tapered surface where the insert contacts the main body of the wedge. A hydraulic or pneumatic cylinder and piston connected to either the first or second telescoping member moves either the first or second telescoping member in the one direction to increase the width of the wedge. Preferably, the other of the telescoping members is held in a stationary position while the insert is moved into the main body of the wedge. Desirably, the wedge insert has a hole that is engaged by either the first or second telescoping member and the main body of the wedge has a slot through which the hole in the insert can be engaged. When fully extended, the extended length of the telescoping member and width of the frame exceeds the clearance distance between the stator and rotor of the dynamoelectric machine.

BRIEF DESCRIPTION OF THE DRAWINGS

For a better understanding of the invention, reference may be made to the preferred embodiments exemplary of the invention, shown in the accompanying drawings in which:

FIG. 7 is a sectional side view of a portion of the remote controlled maintenance vehicle of FIG. 5 illustrating the telescoping members and miniature piston drive mechanisms in their fully extended position;

FIG. 8 is a sectional side view of the remote controlled maintenance vehicle of FIG. 5 illustrating the telescoping members in a 50% retracted position; and FIG. 9 is a side sectional view of a portion of the remote controlled maintenance vehicle of FIG. 5 showing the telescoping members and miniature piston drive mechanisms in a fully retracted position.

DESCRIPTION OF THE PREFERRED EMBODIMENTS

Figure 1:
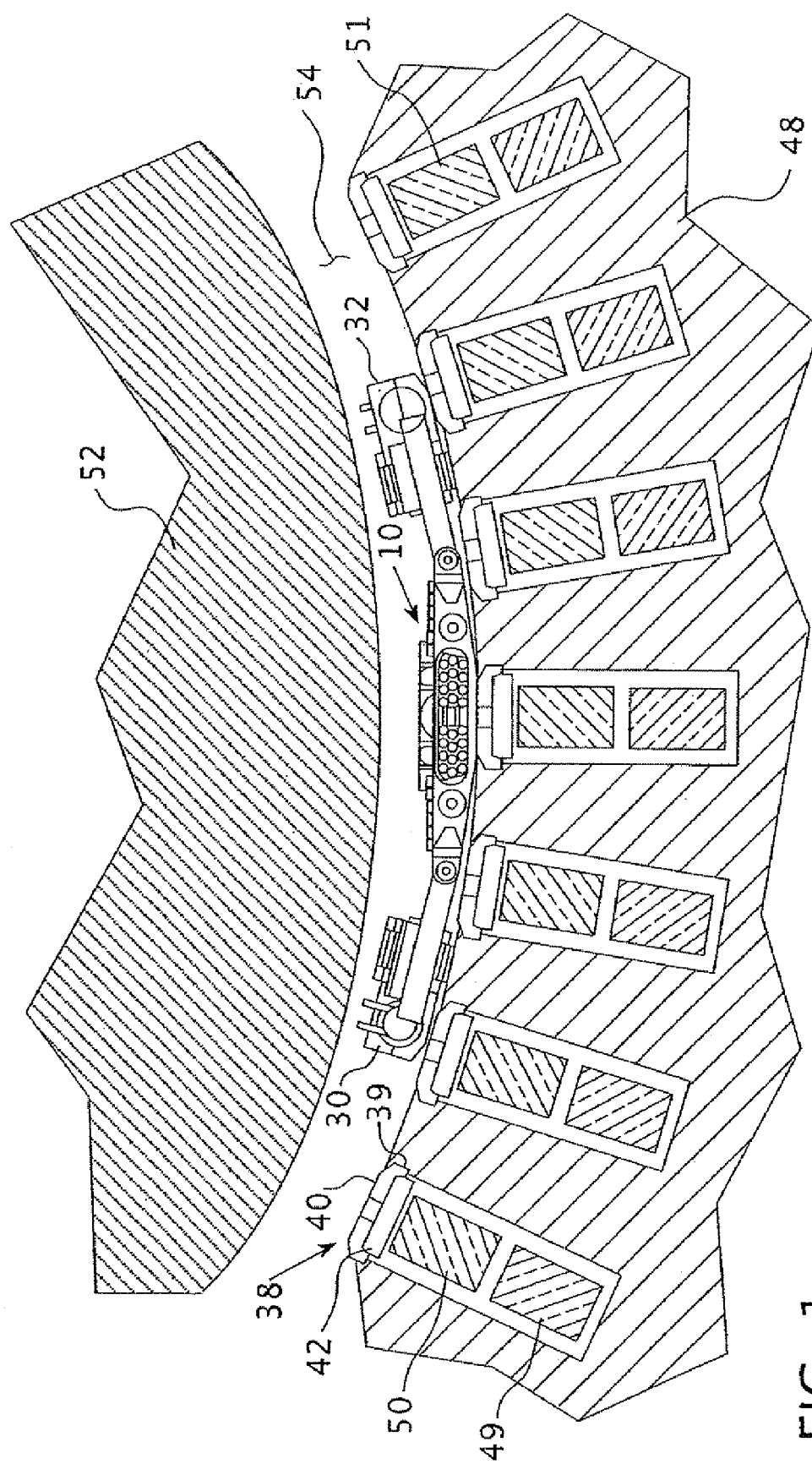
FIG. 1 is a sectional view of a portion of a generator rotor and stator showing the coils in the stator slots anchored by a wedge and the remote controlled maintenance vehicle of this invention seated in the air gap on the stator over a wedge.

FIG. 1 shows a partial cross-section of a generator rotor 52 and stator 48 with coil slots 51. A top coil 50 and bottom coil 49 is firmly situated in each of the coil slots 51 and, as will be described more fully hereafter, is held firmly in place by the wedge 38. The wedge 38 includes a main body 40 and insert 42 which cooperate together to firmly hold the wedge 38 within the dovetail 39 of the coil slot 51. The remote controlled dynamoelectric machine maintenance vehicle 10 of this invention is shown resting on the surface of the generator stator 48, flanked by its motorized track drive assemblies 30 and 32 within the air gap 54 between the generator stator 52 and the generator rotor 48. The maintenance vehicle of this invention 10 is shown centered over the main body 40 of a wedge 38 in position to tighten the wedge, as will explained more fully hereafter.

Figure 2:
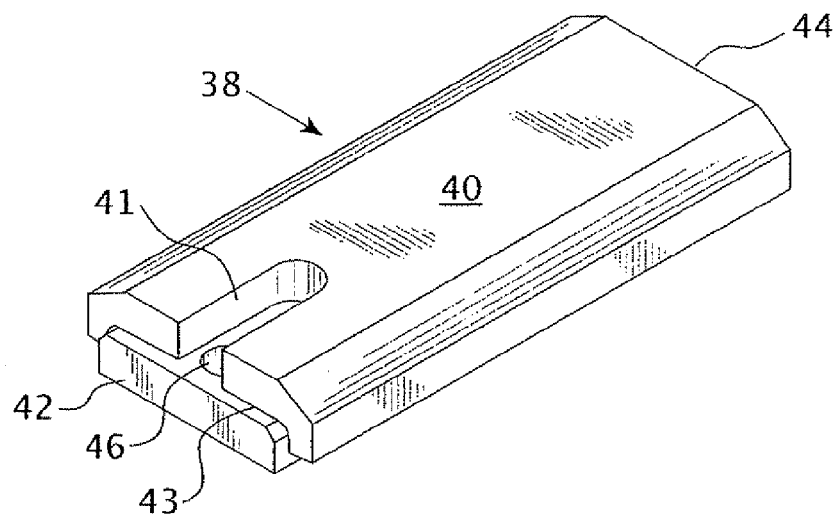
FIG. 2 is a perspective view of the main body of a wedge with a wedge insert in place.
Figure 3:
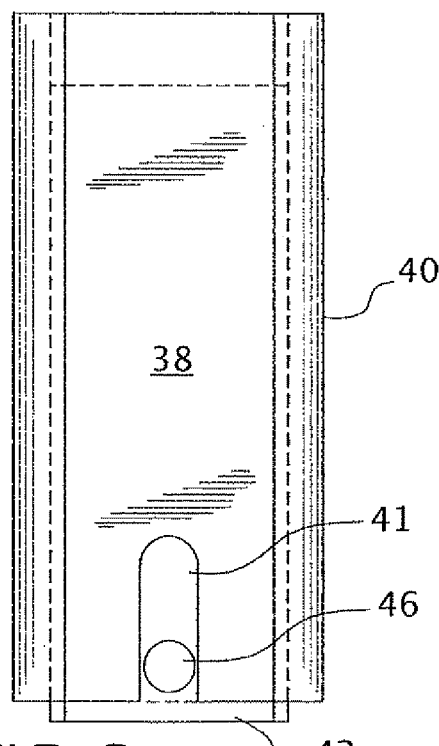
FIG. 3 is a top plan view of FIG. 2.
Figure 4:
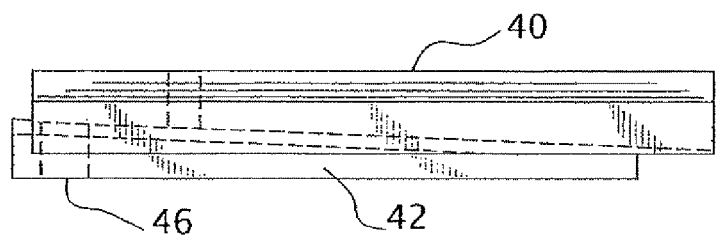
FIG. 4 is a side plan view of FIG. 2.

The wedge 38 is more fully illustrated in FIGS. 2, 3 and 4. The peripheral cross-section of the main body 40 of the wedge 38 has a contour that matches the peripheral dovetail grooves 39 in the stator slot 51. The lower surface of the cavity 43 of the main body 40 is preferably tapered along its length so that when a corresponding taper on the upper surface of the insert at 42 is driven within the cavity, the height of the wedge 48 is increased, bringing pressure on the coils 49 and 50 to firmly seat the coils in the slot 51. As can best be seen from FIG. 4, preferably the upper surface of the insert 42 and the lower surface of the cavity 43 have matching tapers to maintain the upper surface of the main body 40 of the wedge 38 parallel with the lower surface of the insert 42 to firmly seat the wedge 38 within the dovetail groove 39 of the coil slot 51. As will be explained more fully hereafter, the maintenance vehicle 10 of this invention has two latch pins for respectively securing the insert 42 and the main body 40 and driving the insert 42 inwardly within the cavity 43 of the main body 40 of the wedge 38. One of the latch pins engages a hole 46 within the insert 42 though a slot 41 in the main wedge body 40; while the other of the latch pins of the maintenance vehicle 10 is positioned against a backing pin contact area 44 on the other side of the main body 40 of the wedge 38. One or other of the latch pins are then driven towards the other to tighten the wedge within the coil slot 51.

Figure 5:
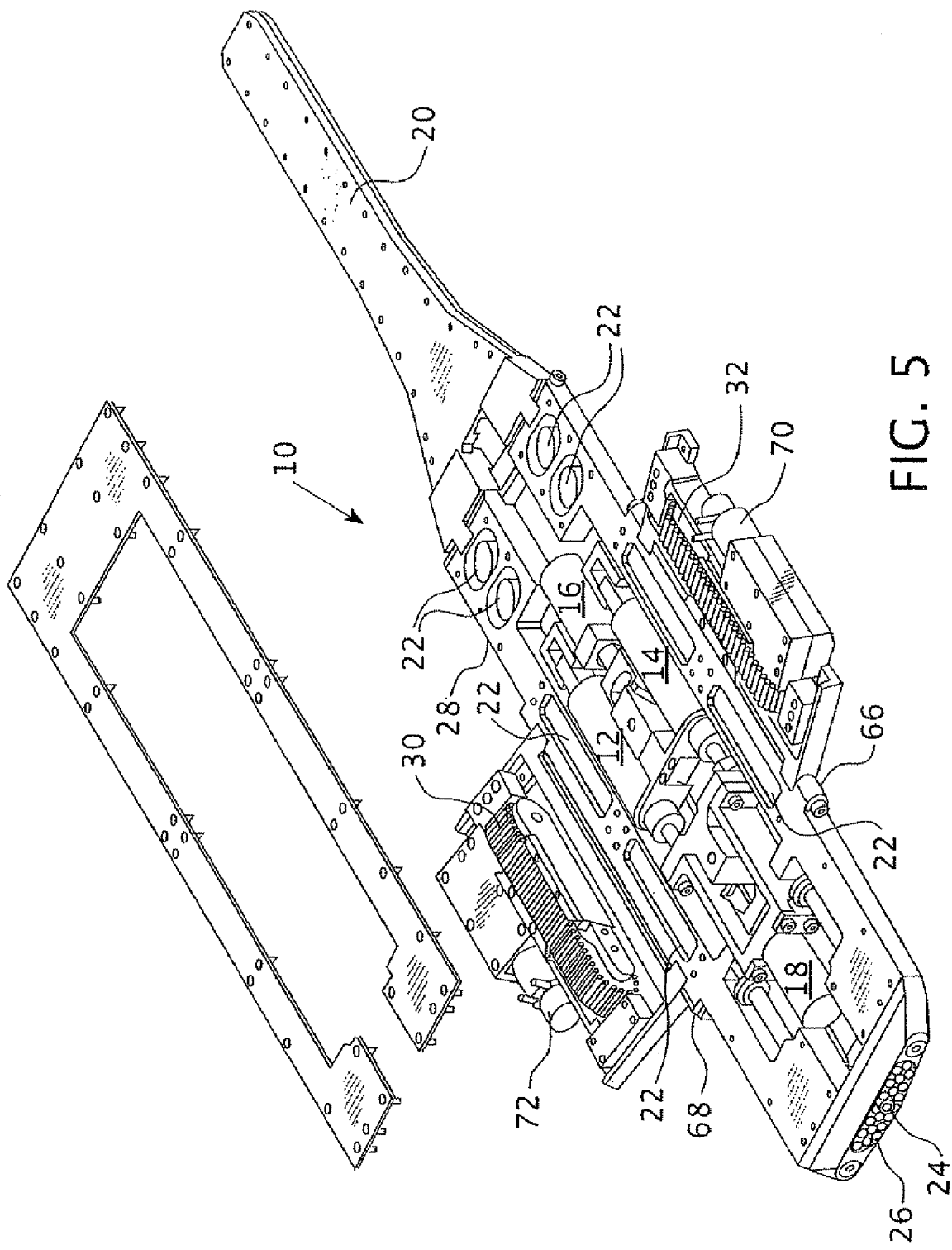
FIG. 5 is a perspective view of the remote controlled maintenance vehicle of this invention with the top cover shown removed.
Figure 6:
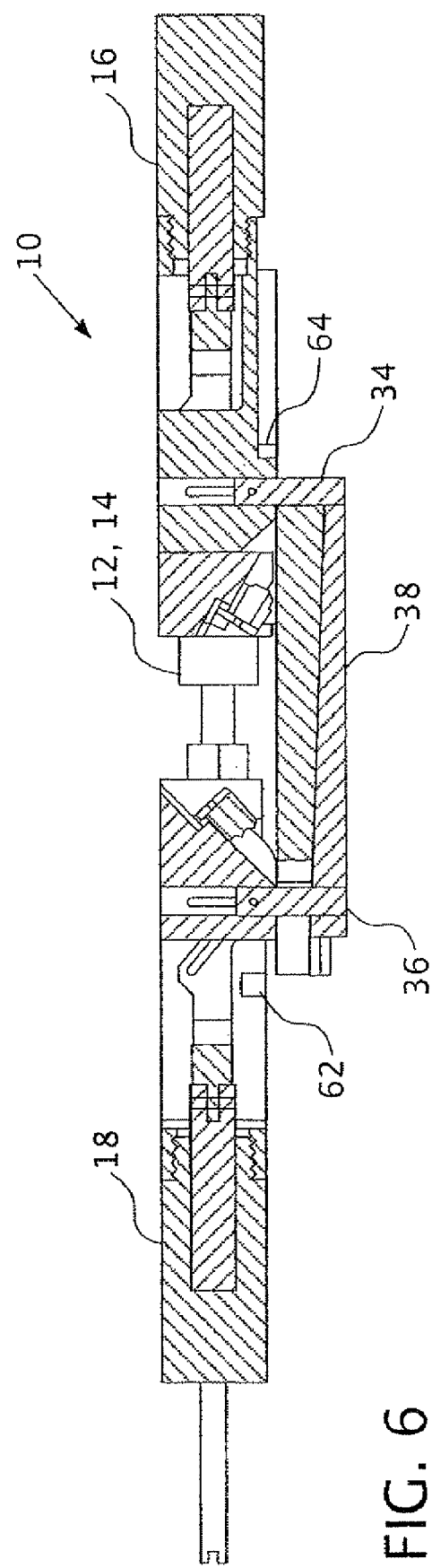
FIG. 6 is a sectional view of a portion of the remote controlled maintenance vehicle of FIG. 5 illustrating the telescoping members fully extended engaging a wedge.

The basic drive carriage of the remote-controlled dynamoelectric machine maintenance vehicle 10 of this invention is generally described in U.S. Pat. No. 6,889,783, issued May 10, 2005 to the assignee of this invention. The main carriage and drive train of the remote-controlled dynamoelectric machine 10 of this invention is basically shown in FIG. 5. The vehicle 10 is a low clearance motorized vehicle that is comprised of a main body 28, two motorized track drive assemblies 30 and 32, and a "tail" section 20 which manages the electrical/hydraulic/pneumatic cables and is used as a handle for insertion and removal of the vehicle 10 in and out of the generator air gap 54. Though the vehicle 10 is shown and described as applied to a generator, it should be appreciated that it can be applied in any large dynamoelectric machine that employs wedges that can be tightened in place. The main body 28 houses two wedge compression pistons 12 and 14 which can be either hydraulic or pneumatic. In this example, the wedge compression pistons 12 and 14 have a 0.875" (2.22 cm) diameter bore. These pistons will extend and retract a forward drive pin assembly positioning the telescoping drive pin 36 over the hole 46 in the wedge 38 with the ability to exert up to 200 pounds of force to tighten the wedge 38. The drive pin assemblies can best be viewed from the side cross-sectional view shown in FIG. 6. The main body of the remote controlled dynamoelectric machine maintenance vehicle 10 of this invention also incorporates two miniature pneumatic, spring return pistons 16 and 18. Each of the miniature pistons 16 and 18 is independently activated and mechanically linked to telescoping pin mechanisms 34 and 36, one of which is inserted into the tapered wedge insert hole 46 and the other is inserted at the backing pin contact area 44 at the other end of the main body of the wedge 38. Since the vehicle 10 will be used around the inside diameter of the stator 48, the main body 28 also has provisions for embedding eight rare-earth magnets 22 at various locations to assure adhesion at all points in the generator. The spring return action of the miniature pneumatic pistons 16 and 18 will act as a "fail safe" to remove the drive pins 34 and 36 from the wedge 38 if a pneumatic system failure should occur. Two remote video cameras 62 and 64, respectively located near the telescoping pins 36 and 34, are used to observe the positioning and insertion of the telescoping pins 34 and 36. Two "side car" track drives 30 and 32, located on either side of the main body 28, are mounted on pivoting mounts 66 and 68 to accommodate various diameter stators. These drives are motorized with variable speed motors 70 and 72. Rare-earth magnets 22 are embedded in the drive units to maintain contact in all areas of the generator. A forward-looking video camera 24 with lights 26 is mounted in the front of the main body 28, as shown in FIG. 5.

The tail section 20 of the vehicle 10 is used to house the umbilical cable containing the wiring and hoses to operate the unit. It is also used as an insertion/removal handle for placing the vehicle carriage 10 inside the generator.

As can be best appreciated from FIGS. 6, 7, 8 and 9, the telescoping drive pins 34 and 36 are mechanically linked to the miniature pneumatic pistons 16 and 18 by the mechanical linkage 58 that has a diagonal slot 60 that captures a pin 56 in the upper end of the telescoping pins 34 and 36. The pins 34 and 36 are retracted when the miniature pneumatic pistons 16 and 18 are de-energized and the linkage 58 is fully extended. This telescoping action is necessary, since the combined length of the pins 34 and 36 and the width of the main frame 28 at full pin insertion in the wedge 38, exceeds the clearance distance for the air gap 54 between the stator 48 and the generator rotor 52.

The wedge tightening process proceeds as follows. The vehicle 10 of this invention will be driven into position using the video cameras 24, 62 and 64 to view the forward progress and pin 34 and 36 alignment with the wedge 38. With the hydraulic wedge compression pistons 12 and 14 in the fully-extended position (the drive pin 36 positioned above the tapered wedge insert hole 46), viewing the fixed pin 34 via the video camera 64, the fixed pin 34 will latch to the back 44 of the tapered wedge 38. Then, while viewing the insertion pin camera 62, the hydraulic pistons 12 and 14 will be actuated, drawing the insertion pin 36 into position over the tapered wedge insert drive hole 46. Pneumatic piston 18 is then energized to insert the pin 36 into the hole 46. Regulated hydraulic pressure is then applied to the hydraulic wedge compression pistons until the proper force is achieved, tightening the wedge 38. The miniature pneumatic pistons 16 and 18 are then de-energized, retracting the pins 34 and 36, and the carriage 10 is driven to the next position.

FIG. 7 more fully shows the position of the linkage 58 extending from the miniature pneumatic pistons 16 and 18 when the telescoping pins 34 and 36 are fully extended. FIG. 8 shows the position of the linkage 58 with the telescoping pins 50% retracted, and FIG. 9 shows the arrangement of the linkage 58 between the miniature pneumatic pistons and the telescoping pins with the telescoping pins 34 and 36 fully retracted.

Thus, by using this remotely-controlled "low clearance" style carriage 10, the need to remove the rotor 52 for wedge tightening is eliminated. Thus, down time for the generator can be greatly reduced.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A remote-controlled dynamoelectric machine maintenance vehicle, comprising:
    a frame;
    at least one drive module attached to the frame and having a drive train that utilizes magnetic adhesion to traverse an interior ferromagnetic surface of the dynamoelectric machine;
    a motor operatively connected to the drive module and responsive to a signal from a remote-controller, the motor providing a motive force to the drive train;
    an effectuator attached to the frame and operable to engage a wedge on the dynamoelectric machine and remotely increase a dimension of the wedge in the slot to tighten the wedge against a coil in a dynamoelectric machine slot; and
    wherein the dynamoelectric machine maintenance vehicle is sized and configured to fit between a stator of the dynamoelectric machine and rotor of the dynamoelectric and the wedge comprises a main body and an insert wherein movement of the insert relative to the main body in one direction increases the width of the wedge in the dynamoelectric machine slot and tightens the coil within the slot and the effectuator comprises a first and a second, spaced, telescoping members, the first, telescoping member operable, upon command, to extend from one side of the frame and engage the wedge insert and the second, telescoping member operable to extend from the one side of the frame and engage the main body of the wedge and at least one of the first and second telescoping members operable to move in the one direction relative to the other of the first and second telescoping members and tighten the wedge in the slot.

2. The remote-controlled dynamoelectric machine maintenance vehicle of claim 1 wherein the first and second telescoping members are pins that substantially fully retract into the frame when not extended.

3. The remote-controlled dynamoelectric machine maintenance vehicle of claim 1 wherein the first and second telescoping members are piston operated to retract and extend from the frame.

4. The remote-controlled dynamoelectric machine maintenance vehicle of claim 3 wherein the pistons are biased in the retracted position so that the first and second telescoping members are in a retracted position if a corresponding energy supply is disconnected from the pistons.

5. The remote-controlled dynamoelectric machine maintenance vehicle of claim 1 including a camera assembly for remotely viewing the engagement of the first telescoping member or the second telescoping member with the main body of the wedge or the insert of the wedge.

6. The remote-controlled dynamoelectric machine maintenance vehicle of claim 5 wherein the camera assembly views the engagement of the first and second telescoping members with the main body and the insert of the wedge.

7. The remote-controlled dynamoelectric machine maintenance vehicle of claim 1 wherein the first telescoping member engages a hole in the insert to the wedge and the second telescoping member engages a first end of the main body of the wedge that is opposite a second end of the main body of the wedge into which the insert enters.

8. The remote-controlled dynamoelectric machine maintenance vehicle of claim 1 wherein at least one of the insert or the main body of the wedge has an inclined, tapered surface where the insert contacts the main body of the wedge.

9. The remote-controlled dynamoelectric machine maintenance vehicle of claim 8 wherein both the insert and the main body of the wedge have inclined, tapered surfaces where the insert contacts the main body of the wedge.

10. The remote-controlled dynamoelectric machine maintenance vehicle of claim 1 including a hydraulic or pneumatic cylinder and piston connected to either the first or second telescoping member for moving either the first or second telescoping member in the one direction.

11. The remote-controlled dynamoelectric machine maintenance vehicle of claim 1 wherein one of the first or second telescoping members is held in a stationary position while the other of the first and second telescoping members are moved in the one direction.

12. The remote-controlled dynamoelectric machine maintenance vehicle of claim 1 including a forward looking video camera mounted in the front of the frame.

13. The remote-controlled dynamoelectric machine maintenance vehicle of claim 12 wherein the forward looking video camera includes lights.

14. The remote-controlled dynamoelectric machine maintenance vehicle of claim 1 wherein the length of the first and second telescoping members when fully extended exceeds the clearance distance between a stator and a rotor of the dynamoelectric machine.

15. The remote-controlled dynamo electric machine maintenance vehicle of claim 1 wherein the wedge insert has a hole that is engaged by either the first or the second telescoping member and the main body of the wedge has a slot through which the hole in the insert can be engaged by either the first or the second telescoping member.

* * * * *